United States Patent [19]

McCluskey et al.

[11] 4,047,863
[45] Sept. 13, 1977

[54] APPARATUS FOR REPAIR OF SHATTERPROOF GLASS

[75] Inventors: Douglas McCluskey, Greenlane; Harley E. Kelchner, Hatfield, both of Pa.

[73] Assignee: Glass Medic, Inc., Hatfield, Pa.

[21] Appl. No.: 760,339

[22] Filed: Jan. 18, 1977

Related U.S. Application Data

[63] Continuation of Ser. No. 668,469, March 19, 1976, abandoned.

[51] Int. Cl.² .............................................. B29C 11/00
[52] U.S. Cl. .................................... 425/13; 425/12; 425/405 R; 264/36; 156/94
[58] Field of Search ................... 425/11, 12, 13, 14, 425/469, 405 R, 110, 127, 128, 129 R, DIG. 60, DIG. 26, 77; 249/83; 264/36; 156/94, 98

[56] References Cited

U.S. PATENT DOCUMENTS

| | | | |
|---|---|---|---|
| 1,926,415 | 9/1933 | Wertz | 425/13 |
| 2,744,290 | 5/1956 | Corson | 425/13 |
| 2,851,760 | 9/1958 | Taylor | 425/11 X |
| 3,012,299 | 12/1961 | Dernaison | 249/83 X |
| 3,178,793 | 4/1965 | Rosengarten et al. | 425/13 |
| 3,458,607 | 7/1969 | Sullivan et al. | 425/12 X |
| 3,509,597 | 5/1970 | Kirk | 425/77 |
| 3,571,857 | 3/1971 | Rhyne | 425/129 |
| 3,914,145 | 10/1975 | Forler et al. | 425/12 X |

*Primary Examiner*—J. Howard Flint, Jr.
*Attorney, Agent, or Firm*—Smith, Harding, Earley & Follmer

[57] ABSTRACT

In the repair of damaged shatterproof glass by the introduction of a polymerizable liquid into a conical crack a vacuum is intermittently released and reapplied to the damaged area by means of a vacuum chamber connected to a vacuum pump through a line having an opening to the atmosphere which opening is adapted to be rapidly opened and closed by an operator's finger. The opening is threaded to receive a removable needle valve for accurate vacuum control. The vacuum chamber has a transparent end wall for viewing the work and a translucent cylindrical side wall allowing external light to illuminate the work without glare. A flexible seal in the end wall of the vacuum chamber allows a probe to be operated while the vacuum is applied. A plunger-sleeve combination, extending through the end wall is used to apply pressure to the liquid without releasing the vacuum.

26 Claims, 4 Drawing Figures

APPARATUS FOR REPAIR OF SHATTERPROOF GLASS

CROSS REFERENCE TO RELATED APPLICATION

This is a continuation of our copending application Ser. No. 668,469 filed Mar. 18, 1976, now abandoned.

BRIEF SUMMARY OF THE INVENTION

This invention relates to the repair of shatterproof glass, and particularly to novel apparatus for facilitating the repair of a conical crack of the kind which forms in shatterproof glass when it is struck by a rapidly moving small stone or other missile. The conical crack is formed by the separation of a small cone of glass from the remainder of one of the outer laminations in shatterproof glass. The small cone of glass is trapped within a similarly shaped space in the lamination, and cannot be removed without further destruction of the lamination. The crack, between the cone and the glass from which it separated is highly visible.

A number of patents have issued relating to apparatus and methods for effecting repairs by the introduction of polymerization materials. In U.S. Pat. No. 3,562,366, which issued on Feb. 9, 1971 to W. E. Sohl, a method is described in which ultrasonic energy is used to aid the introduction of polymerizable liquid resin into the damaged area. A probe is used to push the cone of glass which separates when the crack is formed, in order to enlarge the crack during the entry of resin. U.S. Pat. No. 3,765,975, which issued on Oct. 6, 1973 to Hollingsworth, describes a method in which the damaged area is covered by an enclosure which communicates with a syringe through a needle. The plunger of the syringe is manipulated to apply negative and positive pressures alternately in order to aid the introduction of a polymerizable resin. In U.S. Pat. No. 3,841,932, which issued on Oct. 15, 1974 to C. R. Forler et al., a special method of manipulating a probe is described for facilitating the introduction of resin.

The method described by Hollingsworth is the only one which involves the application of a vacuum, and the practice of the method described by Hollingsworth requires the manipulation of the syringe for a number of cycles sufficient to cause the disappearance of all visible evidence of voids in the pock-marked area. While, with the method of Forler et al., it is possible for the repairman to observe the introduction of resin, it has heretofore been impossible to observe the introduction of resin where a vacuum is applied. For example, in Hollingsworth, the block used to enclose the damaged area in order that the vacuum might be applied, precludes the viewing of the introduction of resin by the person manipulating the plunger. The probe of Hollingsworth's apparatus is threaded into the block, and is used solely for holding the cone in a position such that the crack is widened while resin is introduced by the alternate application of vacuum and pressure. In Hollingsworth's apparatus, when the vacuum is released during the alternate application of vacuum and pressure, the volume underneath the block can fill with air unless the seal between the block and the glass is maintained tightly. Consequently, it is possible for air to be reintroduced into the crack when pressure is applied. The seal between Hollingsworth's block and the glass is maintained by the use of an external framework.

The principal objects of this invention are to provide an improved apparatus for utilizing a vacuum to introduce polymerizable material into a conical crack in shatterproof glass, wherein: the vacuum is more easily controlled; the damaged area can be readily observed during the introduction of polymerizable liquid; introduction of polymerizable material can be more readily aided by probe manipulation while the vacuum is applied, and pressure can be used to aid the introduction of polymerizable liquid while the likelihood of the simultaneous introduction of air is reduced. Various other objects will be apparent from the following detailed description.

Briefly, the invention comprises means for cooperating with an area on the surface of shatterproof glass surrounding a conical crack to provide an enclosure bounded in part by said area; means for evacuating the enclosure; and controllable means for releasing air into said enclosure for reducing the vacuum therein, said controllable means comprising means providing a passage for communication between the interior of the enclosure and the surrounding atmosphere. Preferably, the means to provide an enclosure includes transparent means for permitting the viewing of the conical crack while said means to provide an enclosure is in place. Where the use of a probe is desired, said means to provide an enclosure comprises means forming a wall, means for causing said wall to be spaced from said area when said enclosure is bounded in part by said area, said wall being formed in part by a flexible diaphragm, and said apparatus including a sharp probe tip, located within said enclosure, and manipulable means connected to said probe tip through said diaphragm for controlling movement of said probe tip.

The probe can be replaced by an assembly for applying pressure to the damaged area. To that end, the wall is provided with an opening having threads, and the apparatus includes a sleeve threaded into said opening and movable toward and away from the area surrounding the conical crack by the relative action of said threads, annular sealing means on one end of said sleeve adapted to contact the surface, whether flat or curved, of a piece of shatterproof glass to be repaired and thereby isolate a small portion of said area from the remainder thereof, said first control means manipulable from the exterior of said enclosure for rotating said sleeve in order to move the same toward and away from said area, said sleeve having a cylindrical channel in its interior communicating with said one end thereof, a plunger closely fitting the wall of said channel and axially movable therein, and second control means manipulable from the exterior of said enclosure for effecting axial movement of said plunger.

Other details and important features of the invention will be apparent from the following detailed description when read in conjunction with the drawings.

DETAILED DESCRIPTION

There are several reasons for applying a vacuum in the repair of shatterproof glass. First, the vacuum helps to eliminate moisture which is detrimental to the repair process. Secondly, the vacuum is helpful in causing the polymerizable liquid to flow into the conical crack or fracture between the glass lamination and the cone which separated therefrom when the damage occurred. Third, the vacuum causes the polymerizable liquid to wet the glass more completely, thereby improving the quality of the repair. Finally, the vacuum aids in eliminating air bubbles from the polymerizable liquid.

We have discovered that the rapid intermittent application of vacuum greatly enhances the wetting effect of the polymerizable liquid, enabling us to produce high quality repairs much more rapidly than has been possible heretofore. In order to effect rapid changes in the vacuum applied to the damaged area, an apparatus such as that shown in FIG. 1 is used.

Figure 1:
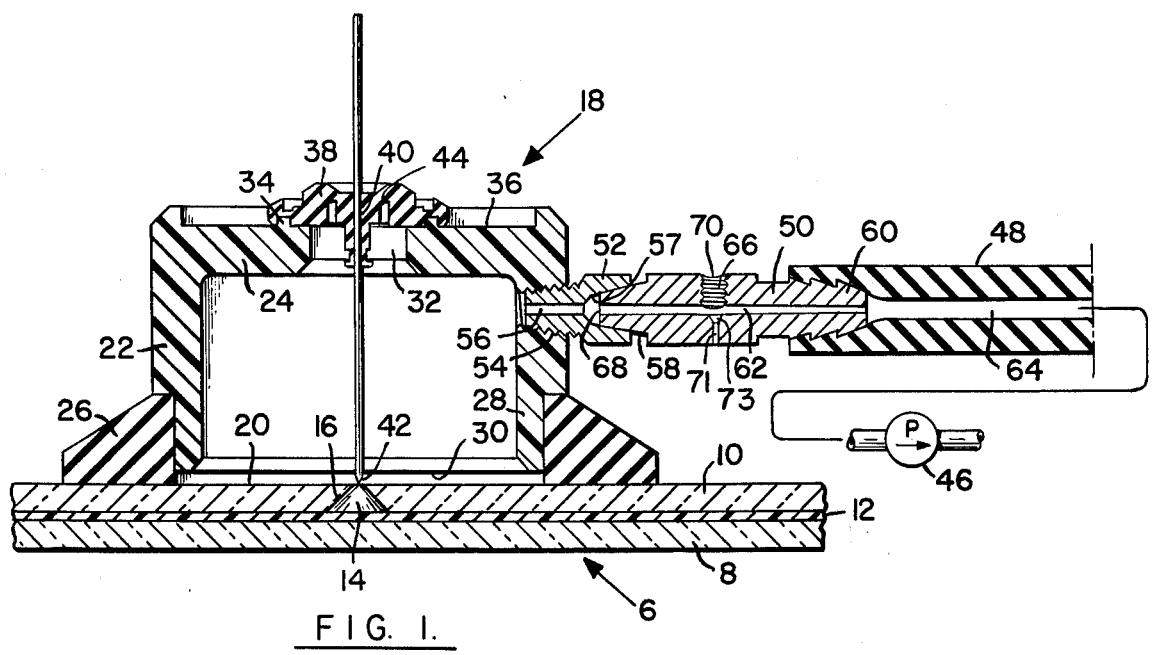
FIG. 1 is a cross-sectional view showing a piece of shatterproof glass and one embodiment of an apparatus in accordance with the invention positioned on said glass for repair of a conical crack therein.

FIG. 1 shows a typical pane 6 of shatterproof glass, comprising a first glass lamination 8, and a second lamination 10 spaced from each other by a plastic lamination 12, which adheres to both glass laminations and prevents them from shattering upon impact.

When one of the glass laminations, for example lamination 10, is struck by a stone or other small, hard object, a pock-mark may form, which is characterized by the separation of a cone 14 of glass from the remainder of the lamination 10. The cone has its base in contact with plastic lamination 12, and its apex is usually very slightly below the exposed surface of lamination 10. The separation of cone 14 from lamination 10 produces a conical crack 16 which interrupts the passage of light through the pane 6.

The repair apparatus shown in FIG. 1 comprises a cup 18 which cooperates with an area of surface 20 of lamination 10 surrounding the apex of the cone to provide an enclosure which can be evacuated. Cup 18 preferably comprises a generally cylindrical side wall 22, and an end wall 24, integral with side wall 22, both consisting of a transparent plastic such as Plexiglas. A flexible ring 26 of closed cell elastomer such as rubber fits onto the outside of a reduced portion 28 at the lower end of side wall 22, and forms a seal. Ring 26 extends below the lower end 30 of wall 22.

A central opening 32 in end wall 24 is surrounded by a circular projection 34 on the outside surface 36 of wall 24. Projection 34 fits into a conforming groove of a diaphragm 38, made from Neoprene or other similar flexible material, and having a central passage through which extends a narrow steel probe 40 having a sharp tip 42 for energizing the apex of cone 14. The diaphragm fits the shank of the probe tightly to provide an air-tight closure. The diaghragm is flexible, and preferably reduced in thickness throughout a circular area 44 surrounding the probe. The reduced area permits easy and rapid movement of the probe in an axial direction to push cone 14 inwardly to enlarge crack 16 in order to aid the introduction of polymerizable liquid into the crack.

End wall 24 is made transparent so that the progress of the repair can be observed without removing the cup 18. Continuous observation of the damaged area, in many cases, greatly increases the rapidity with which a repair is effected.

In order to prevent sunlight, or strong artificial light from interfering with the observation of the repair, while taking advantage of the illumination which they provide, the outer surface of side wall 22 is preferably given a diffuse finish so that external light, which would otherwise strike surface 20 obliquely and cause glare, is diffused. Preferably, substantially all of the area of the side wall through which it would be possible for light to reach the area of lamination 10 enclosed by cup 18 is provided with a diffuse finish.

A continuously operable vacuum pump 46, preferably of the small, electric motor driven, piston type, is connected to the interior of the enclosure formed by cup 18 and part of surface 20, through a flexible conduit 48, an adapter 50, and a fitting 52. Fitting 52 is secured in an opening in side wall 22, preferably by means of conical threads 54, which insure an air-tight fit. Internal passage 56 of fitting 52 is provided with a machined conical opening 57, which receives conical projection 58 on adapter 50. Adapter 50 is provided with a standard nipple 60 for connection to flexible conduit 48. The interior of cup 18 communicates with vacuum pump 46 through passage 56 in fitting 52, internal passage 62 in adapter 50, and internal passage 64 in conduit 48. Adapter 50 is also provided with a transverse passage 66, which communicates with internal passage 62, and normally provides communication between the surrounding atmosphere and the interior of the enclosure through transverse passage 66 and the portion of internal passage 62 which is located between the transverse passage and end 68 of passage 62. External opening 70 of passage 66 is of a size sufficiently small to be closed by covering it with the tip of the finger. The vacuum within the enclosure can be controlled by placing a finger over opening 70 and removing the finger therefrom.

In some cases, it is desirable to control the vacuum more accurately than is possible by placing a finger over opening 70. For this reason, passage 66 is threaded. Opposite passage 66 in adapter 50, a second, narrower, transverse opening 71 is provided. The internal end of passage 71 has a conical seat 73 adapted to cooperate with a needle valve such as needle valve 75, shown in FIG. 2. When the needle valve is present, it controls the entry of air into the enclosure through narrow passage 71. When the needle valve is removed, control is effected by placing a finger over opening 70. Desirably, the thumb is used to close opening 70, while another finger closes the end of passage 71.

In some cases, it is desired to apply pressure to the polymerizable liquid in order to insure complete wetting of the surfaces to cone 14 and the cavity in which it sits. The apparatus shown in FIG. 2 permits such pressure to be applied without removing the vacuum, thereby greatly reducing the likelihood of introducing air into the crack in the application of pressure.

Figure 2:
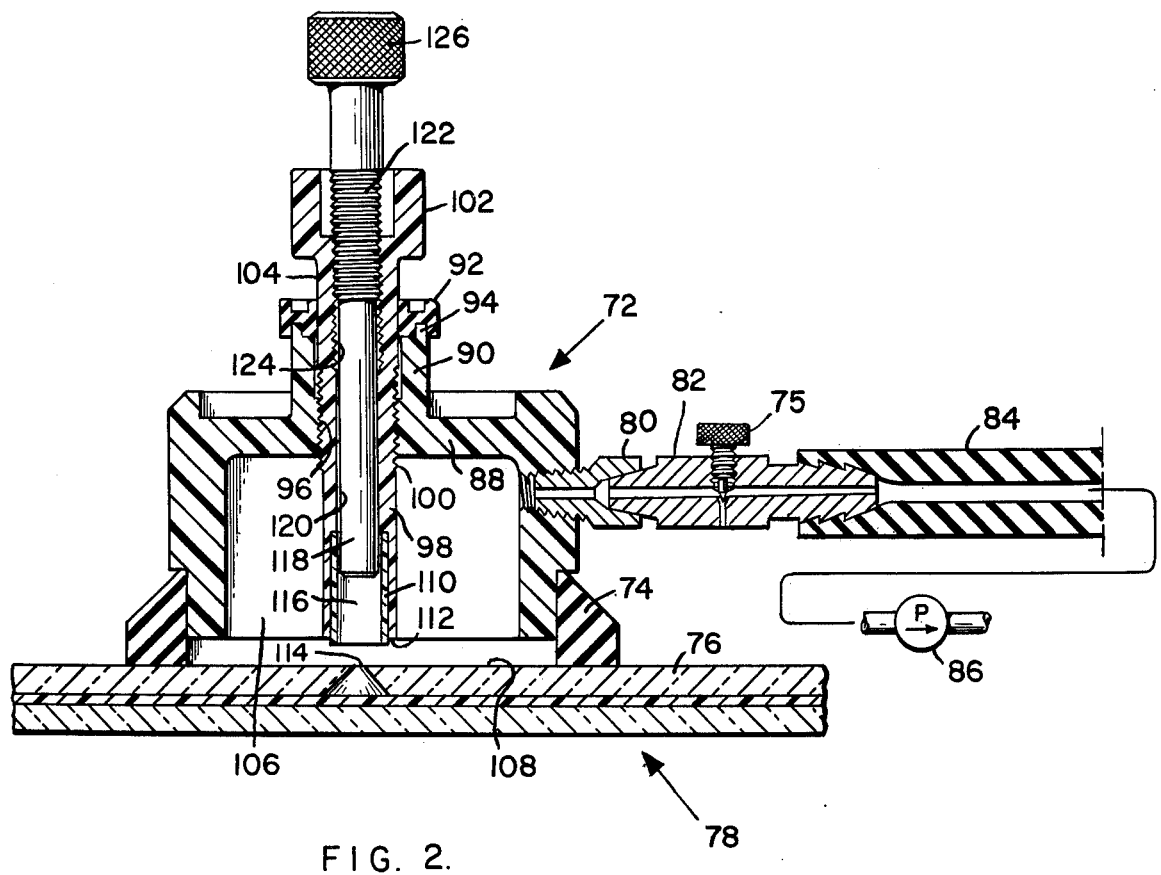
FIG. 2 is a cross-section view similar to FIG. 1, showing a second embodiment of the invention equipped with a pressure-applying assembly.

The apparatus of FIG. 2 comprises a cup 72, similar to cup 18, having a sealing ring 74, shown in cooperation with lamination 76 of a shatterproof glass pane 78. Fitting 80, adapter 82, flexible conduit 84 and vacuum pump 86 are identical to the corresponding elements, shown in FIG. 1.

Cup 72 differs from cup 18 in that its end wall 88 is provided with a neck 90 having a central opening. A Neoprene seal 92 sits on a circular projection 94 at the upper end of neck 90. The opening in end wall 88 is internally threaded at 96, and a sleeve 98 extends therethrough. Sleeve 98 is provided with threads 100 which cooperate with threads 96 in such a way that the sleeve can be moved upwardly or downwardly by rotation relative to the cup. A manipulable control, constituted by an enlarged portion 102 at the upper end of the sleeve, is provided to facilitate manual rotation of the sleeve, and may be knurled or formed with a non-circular cross-section so that it can be grasped firmly. A cylindrical portion 104 of the sleeve, located below enlarged portion 102, and above threads 100, fits tightly within a cylindrical central opening of seal 92 to prevent the entry of air into enclosed space 106 defined by the walls of the cup and by the area 108 of lamination 76 located within the confines of sealing ring 74.

At the lower end of sleeve 98, there is secured an annular seal 110. Seal 110 is preferably a short length of Neoprene or rubber tubing. It fits within an enlarged cylindrical section at the lower end of sleeve 98, and extends slightly beyond lower end 112 of the sleeve, so that it can engage surface 108 about apex 114 of the conical crack to isolate space 116 within seal 110 from the remainder of space 106 underneath the cup. Seal 110 fits snugly within the end of sleeve 98, but can be easily removed and replaced.

A cylindrical plunger 118 fits closely within a cylindrical channel 120 in sleeve 98, and extends downwardly into the interior of seal 110. A threaded portion 122 on the plunger cooperates with threads 124 within the upper portion of the interior of the sleeve, so that rotation of a second control, constituted by an enlarged knurled portion 126 at the upper end of the plunger, relative to the sleeve, can produce axial movement of the plunger within the sleeve in either direction as desired.

The primary purpose of threads 122 and 124 is to retain the plunger against movement toward surface 108 as a result of the application of a vacuum to space 105. The threads also permit the application of a relatively high pressure to space 116 by downward movement of plunger 118.

Figure 3:
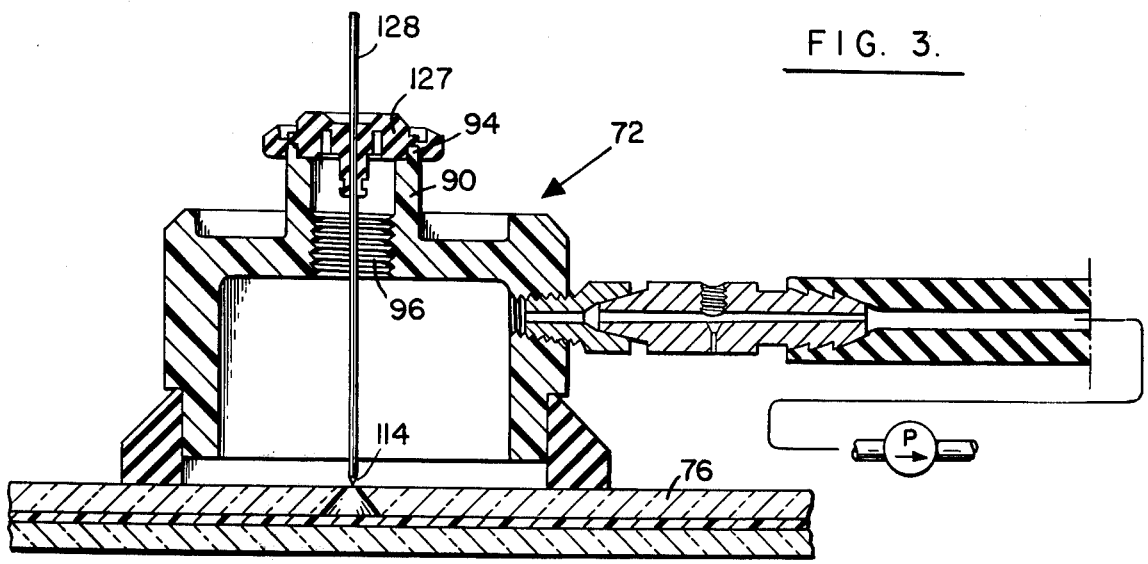
FIG. 3 is a cross-sectional view similar to FIG. 2, showing the enclosure of FIG. 2 equipped with a probe instead of the pressure-applying assembly.

Cup 72 is so designed that, instead of the sleeve and plunger assembly of FIG. 2, a diaphragm and probe assembly can be used with it, as illustrated in FIG. 3. At the outer end of neck 90, a diaphragm 127 is secured by the cooperation of a circular groove therein with circular projection 94. Diaphragm 127 is similar to diaphragm 38, shown in FIG. 1, and a pointed steel probe 128 extends through the diaphragm, and through the interior of the neck to apex 114 of the cone in lamination 76. The probe and diaphragm assembly of FIG. 3 can be readily removed and replaced by the sleeve and plunger assembly of FIG. 2.

The polymerizable liquid used for effecting repairs with the apparatus herein described can be any of the mixtures described in the aforementioned patents to Sohl, Hollingsworth and Forler et al. For example, a mixture consisting of seven parts by weight of polyester acrylic resin mixture, three parts by weight of methyl methacrylate, 0.03 parts by weight of benzoyl peroxide, 0.15 parts by weight of benzoin, and 0.025 parts by weight of vinyl methoxy silane is usable for repair purposes. For best results, however, we prefer to use a polymerizable liquid known as Glass Repair Formula PC17G, available from SNG Laboratories, Inc., P. O. Box 383, Fort Washington, Pa.

Figure 4:
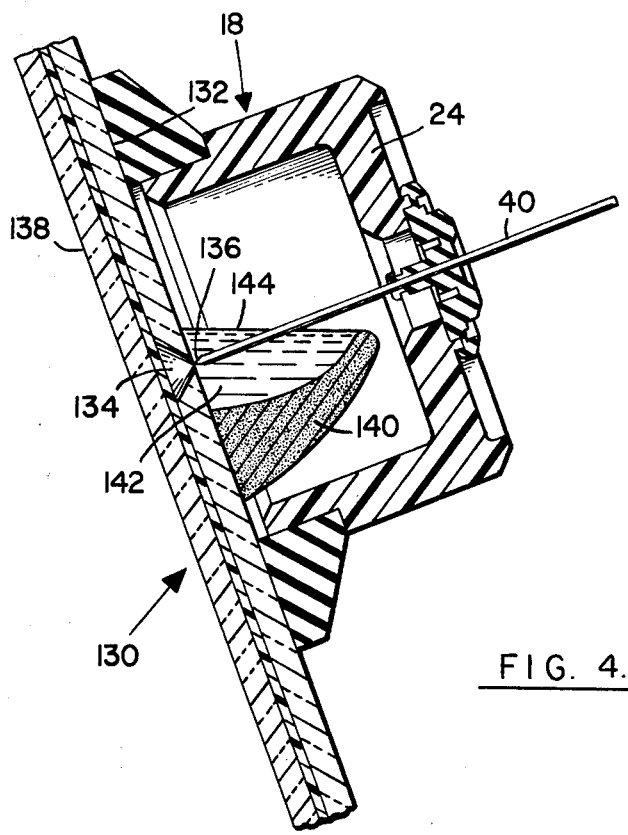
FIG. 4 is a cross-sectional view of the apparatus of FIG. 1, showing the manner in which polymerizable liquid is applied to the conical crack by the use of a putty dam.

Referring now to FIG. 4, which shows the apparatus of FIG. 1 in use in the repair of an automobile windshield 130, a typical repair operation, using the apparatus of FIG. 1, proceeds as follows. First, the surface 132 of the glass surrounding the conical crack 134 is carefully cleaned in order to remove contaminants which might get into the polymerizable liquid. Next, the depression at apex 136 of the cone is cleaned of glass fragments and other foreign debris by means of a probe, or by the use of a wire brush or blast of air. After the cleaning operations have been completed, moisture is removed from the conical crack by the application of a vacuum. This is accomplished by placing the cup 18 in the position shown in FIG. 4, operating vacuum pump 46, and closing opening 70 preferably by threading the needle valve into it. The removal of moisture is facilitated by the application of heat, which is accomplished by means of an infrared lamp, a heat gun of an ordinary light bulb located in close proximity to underside 138 of windshield 130. Moisture can be removed with and without the cup in place.

After moisture is removed, a small, dam-like structure 140, formed by modeling clay, putty, or the like, is constructed at the location of the crack in order to form a reservoir to hold a quantity 142 of polymerizable liquid. All parts of the upper edge 144 of the dam are located slightly above apex 136, but not so high as to interfere with the operation of the probe 40. The dam is then filled with liquid in a quantity at least sufficient to cover the opening at apex 136.

Cup 18 is again placed in the position shown in FIG. 4, and a vacuum is applied by closing opening 70 while the vacuum pump is in operation. While the vacuum is being applied, the probe is moved axially against the apex 136 of cone 134, and pressed axially against the apex one or more times to facilitate the removal of air from the crack and the displacement thereof by the liquid. Probe pressure may also be applied to areas of surface 132 surrounding apex 136 as well as to the rear of the damaged area. In many cases, the flow of liquid into the crack begins to slow down. When this course, the release and reapplication of the vacuum by the opening and closing of opening 70 is used to stimulate the flow of liquid into the crack. Preferably, opening 70 is opened and closed by use of a finger, the needle valve having been previously removed. The vacuum within the enclosure can be changed between maximum vacuum and atmospheric pressure almost instantaneously. The volume of the enclosure is such that the change from full vacuum to atmospheric pressure can be repeated almost as rapidly as the finger can be moved toward and away from opening 70.

The procedure, and particularly the sequence of application of the probe and of the vacuum can be varied. The progress of the repair can be viewed at all times through transparent end wall 24. Probing is often done with the vacuum assembly removed.

In some cases, the crack is satisfactorily filled with liquid as a result of the above procedure, in which event, the apparatus is removed, the dam and the remaining liquid are removed, and the material is cured by the application of long wave ultraviolet light. Excess material is removed from the surface 132 of the windshield by means of a razor blade or similar instrument, and the pock mark at the apex of the cone is filled with a polymerizable material which is the same as or similar to the previously mentioned polymerizable liquid.

In the event that the application of the vacuum together with the use of the probe prove inadequate to fill the crack completely with liquid, the sleeve and plunger apparatus of FIG. 2 is then used. If the original operation was performed with the apparatus of FIG. 3, the installation of the sleeve and plunger assembly is readily accomplished simply by the removal of the probe and diaphragm, and the threading of the sleeve and plunger assembly into the neck of the cup. In either case, before the end of seal 110 comes into contact with the surface of the glass, needle valve 75 is installed, and a continuous vacuum is applied while enlarged end portion 102 of the sleeve is rotated to move seal 110 into contact with the surface of the glass surrounding the apex of the cone, thereby isolating space 116 underneath the plunger from space 106. Enlarged end portion 126 of the plunger is then rotated to move the plunger toward the glass, thereby forcing liquid from the reservoir under pressure into the crack. Following the introduction of liquid under pressure, probe pressure may again be applied, if necessary. After the crack is satisfactorily filled by the application of pressure, the dam and remaining liquid are removed, and the material is cured, and excess material is removed as described above.

As pointed out previously, the vacuum in the part of the enclosure outside the sleeve prevents air from entering space 116. The vacuum also holds the assembly in place on the glass, and eliminates the need for an external framework, thereby greatly simplifying glass repairs using the apparatus of FIG. 2.

We claim:

1. Apparatus for the repair of conical cracks in shatterproof glass comprising:
    means for cooperating with an area on said glass surrounding a conical crack therein, to provide an enclosure bounded in part by said area;
    means for evacuating said enclosure; and
    controllable means for releasing air into said enclosure for reducing the vacuum therein, said controllable means comprising means providing a passage for communication between the interior of said enclosure and the surrounding atmosphere.

2. Apparatus according to claim 1 in which the means for evacuating said enclosure comprises a continuously operable vacuum pump connected to the interior of said enclosure.

3. Apparatus according to claim 1 in which the means for evacuating said enclosure comprises a continuously operable vacuum pump connected to the interior of said enclosure, and in which said passage is normally open to the surrounding atmosphere and is terminated in an opening sufficiently small to be closed by covering it with the tip of a finger.

4. Apparatus according to claim 1 in which said means for evacuating said enclosure comprises a continuously operable vacuum pump connected to the interior of the enclosure, and in which said controllable means also comprises adjustable needle valve means for controlling the flow of air from the surrounding atmosphere through said passage to the interior of said enclosure.

5. Apparatus according to claim 1 in which said means for evacuating said enclosure comprises a continuously operable vacuum pump, connected to the interior of said enclosure, and in which said controllable means also comprises adjustable needle valve means for controlling the flow of air from the surrounding atmosphere through said passage to the interior of said enclosure, said needle valve means comprising a seat formed in said passage, a needle extending into said seat and cooperating therewith to restrict said passage, a threaded passage, and, means connected to said needle and threaded into said threaded passage whereby rotation of said threaded means in said threaded passage adjusts the relationship between said needle and said seat, said means connected to said needle and threaded into said threaded passage being removable therefrom, said threaded passage forming an additional path for the flow of air from the surrounding atmosphere to the interior of said enclosure when said means connected to said needle is removed from said threaded passage, and said threaded passage having an opening to the atmosphere sufficiently small to be closed by covering it with the tip of a finger.

6. Apparatus according to claim 1 in which the means for evacuating said enclosure comprises a continuously operable vacuum pump connected to the interior of said enclosure through a flexible conduit.

7. Apparatus according to claim 1 in which the means for evacuating said enclosure comprises a continuously operable vacuum pump connected to the interior of said enclosure through a flexible conduit, and an adapter having an internal passage providing communication between said flexible conduit and the interior of said enclosure, said adapter also having a transverse passage for providing communication between its internal passage and the surrounding atmosphere, wherein said means providing a passage for communication between the interior of said enclosure and the surrounding atmosphere includes said transverse passage and the portion of said internal passage located between said transverse passage and the end of said internal passage closest to the interior of said enclosure.

8. Apparatus according to claim 1 in which the means for evacuating said enclosure comprises a continuously operable vacuum pump connected to the interior of said enclosure through a flexible conduit, and an adapter having an internal passage providing communication between said flexible conduit and the interior of said enclosure, said adapter also having a transverse passage for providing communication between its internal passage and the surrounding atmosphere, wherein said means providing a passage for communication between the interior of said enclosure and the surrounding atmosphere includes said transverse passage and the portion of said internal passage located between said transverse passage and the end of said internal passage closest to the interior of said enclosure wherein said transverse passage is normally open to the surrounding atmosphere and is terminated in an opening sufficiently small to be closed by covering it with the tip of a finger.

9. Apparatus according to claim 1 in which the means to provide an enclosure includes transparent means for permitting the viewing of the conical crack while said means to provide an enclosure is in cooperation with said area to provide an enclosure bounded in part by said area.

10. Apparatus according to claim 1 in which said means to provide an enclosure comprises a generally cylindrical side wall having flexible sealing means secured at one end for engaging the surface of a piece of shatterproof glass thereby defining said area and an end wall closing the opposite end, substantially all of the part of said sidewall through which light can pass to said area having a diffuse finish, and said end wall comprising transparent means for permitting the viewing of the conical crack.

11. Apparatus according to claim 1 in which said means to provide an enclosure comprises a substantially cylindrical side wall having flexible sealing means secured at one end for engaging the surface of a piece of shatterproof glass thereby defining said area and an end wall closing the opposite end, substantially all of the part of said side wall through which light can pass to said area having a diffuse finish, and said end wall comprising transparent means integral with the side wall for permitting the viewing of the conical crack.

12. Apparatus according to claim 1 in which said means to provide an enclosure comprises means forming a wall, means for causing said wall to be spaced from said area when said enclosure is bounded in part by said area, said wall being formed in part by a flexible diaphragm, and said apparatus including a sharp probe tip, located within said enclosure, and manipulable means connected to said probe tip through said diaphragm for controlling movement of said probe tip.

13. Apparatus according to claim 1 in which said means to provide an enclosure comprises means forming a wall and means for causing said wall to be spaced from said area when said enclosure is bounded in part by said area, said wall having an opening with threads and said apparatus also including a sleeve threaded into said opening and movable toward and away from said area by the action of said threads, annular sealing means on one end of said sleeve adapted to contact the surface of a piece of shatterproof glass to be repaired, and first control means manipulable from the exterior of said enclosure for rotating said sleeve in order to move the same toward and away from said area, said sleeve having a cylindrical channel in its interior communicating with said one end thereof, a plunger closely fitting the wall of said channel and axially movable therein, and second control means manipulable from the exterior of said enclosure for effecting axial movement of said plunger.

14. Apparatus according to claim 13 including means for retaining said plunger against movement toward said piece of shatterproof glass.

15. Apparatus according to claim 14 wherein said retaining means comprises a threaded portion on said plunger, and threaded means within said sleeve engaged with said threaded portion on said plunger.

16. Apparatus for the repair of conical cracks in shatterproof glass comprising:
   means for cooperating with an area on said glass surrounding a conical crack therein, to provide an enclosure bounded in part by said area; and
   means for evacuating said enclosure;
   said means to provide an enclosure including transparent means for permitting the viewing of the conical crack while said means to provide an enclosure is in cooperation with said area to provide an enclosure bounded in part by said area.

17. Apparatus according to claim 16 in which said means to provide an enclosure comprises a substantially cylindrical side wall having flexible sealing means secured at one end for engaging the surface of a piece of shatterproof glass thereby defining said area, and an end wall closing the opposite end, said transparent means forming at least part of said end wall, and substantially all of the part of said side wall through which light can pass to said area having a diffuse finish.

18. Apparatus according to claim 16 in which said means to provide an enclosure comprises a substantially cylindrical side wall having flexible sealing means secured at one end for engaging the surface of a piece of shatterproof glass thereby defining said area, and an end wall closing the opposite end, and wherein said end wall is constituted at least in part by said transparent means, and wherein the transparent part of said end wall is integral with said side wall.

19. Apparatus for the repair of conical cracks in shatterproof glass comprising:
   means for cooperating with an area on said glass surrounding a conical crack therein, to provide an enclosure bounded in part by said area; and
   means for evacuating said enclosure;
   said means to provide an enclosure comprising means forming a wall, means for causing said wall to be spaced from said area when said enclosure is bounded in part by said area, said wall being formed in part by a flexible diaphragm, and said apparatus including a sharp probe tip, located within said enclosure, and manipulable means connected to said probe tip through said diaphragm for controlling movement of said probe tip.

20. Apparatus according to claim 19 in which the means to provide an enclosure includes transparent means for permitting the viewing of the conical crack while said means to provide an enclosure is in cooperation with said area to provide an enclosure bounded in part by said area.

21. Apparatus according to claim 19 in which at least part of said wall is transparent.

22. Apparatus for the repair of conical cracks in shatterproof glass comprising:
   means for cooperating with an area on said glass surrounding a conical crack therein, to provide an enclosure bounded in part by said area; and
   means for evacuating said enclosure;
   wherein said means to provide an enclosure comprises means forming a wall and means for causing said wall to be spaced from said area when said enclosure is bounded in part by said area, said wall having an opening with threads and said apparatus also including a sleeve threaded into said opening and movable toward and away from said area by the action of said threads, annular sealing means on one end of said sleeve adapted to contact the surface of a piece of shatterproof glass to be repaired and thereby isolate a small portion of said area from the remainder thereof, and first control means manipulable from the exterior of said enclosure for rotating said sleeve in order to move the same toward and away from said area, said sleeve having a cylindrical channel in its interior communicating with said one end thereof, a plunger closely fitting the wall of said channel and axially movable therein, and second control means manipulable from the exterior of said enclosure for effecting axial movement of said plunger.

23. Apparatus according to claim 22 in which the means for evacuating said enclosure comprises a continuously operable vacuum pump connected to the interior of the enclosure.

24. Apparatus according to claim 22 including means for retaining said plunger against movement towards said piece of shatterproof glass.

25. Apparatus according to claim 24 wherein said retaining means comprises a threaded portion on said plunger and threaded means within said sleeve engaged with said threaded portion on said plunger.

26. Apparatus for the repair of the conical cracks in shatterproof glass comprising:

means for cooperating with an area on said glass surrounding a conical crack therein, to provide an enclosure bounded in part by said area; and means for evacuating said enclosure;

wherein said means to provide an enclosure comprises means forming a wall and means for causing said wall to be spaced from said area when said enclosure is bounded in part by said area, said wall having an opening with threads and said apparatus also including a sleeve threaded into said opening and movable toward and away from said area by the action of said threads, annular sealing means on one end of said sleeve adapted to contact the surface of a piece of shatterproof glass to be repaired and thereby isolate a small portion of said area from the remainder thereof, and control means manipulable from the exterior of said enclosure for rotating said sleeve in order to move the same toward and away from said area, said sleeve having a channel in its interior communicating with said one end thereof, and means operatively associated with said channel to force a repair liquid into said conical crack.

* * * * *